E. B. CANTRELL AND G. E. MILLER.
WHEEL PULLER.
APPLICATION FILED OCT. 9, 1917.

1,310,154.

Patented July 15, 1919.

WITNESS:

INVENTORS:
Edwin B. Cantrell
George E. Miller
BY
Strong & Townsend
ATTORNEYS.

UNITED STATES PATENT OFFICE.

EDWIN B. CANTRELL AND GEORGE E. MILLER, OF SAN FRANCISCO, CALIFORNIA.

WHEEL-PULLER.

1,310,154.  Specification of Letters Patent.  Patented July 15, 1919.

Application filed October 9, 1917. Serial No. 195,531.

*To all whom it may concern:*

Be it known that we, EDWIN B. CANTRELL and GEORGE E. MILLER, citizens of the United States, residing at the city and county of San Francisco and State of California, have invented new and useful Improvements in Wheel-Pullers, of which the following is a specification.

This invention relates to a wheel puller. One of the objects of the present invention is to provide a simple and substantial form of wheel puller comprising a cap-shaped member, one end of which is internally threaded and sufficiently large to be received by the threads provided for the hub cap. Another object of the invention is to split the threaded enlarged end of the puller and to provide an external, tapered thread for the reception of a nut to permit the split sections of the puller to be contracted to securely grip the threads of the wheel hub when the puller is applied. Another object of the invention is to provide a screw which is carried by the puller and so positioned that it may engage the end of the wheel axle and exert sufficient pressure when turned to pull the wheel off of the axle. Further objects will hereinafter appear.

The invention consists of the parts and the construction and combination of parts as hereinafter more fully described and claimed, having reference to the accompanying drawings, in which—

Figure 1:
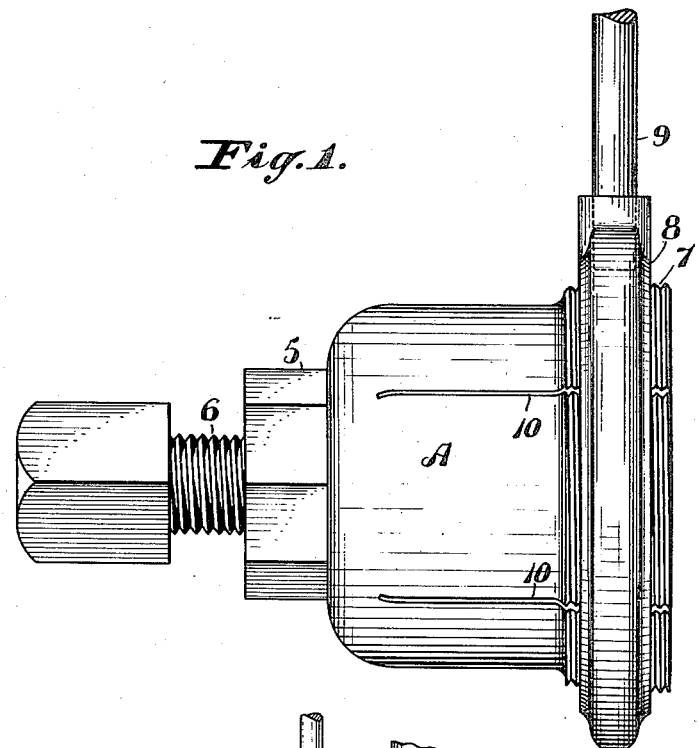
Figure 1 is a side elevation of the wheel puller.

Referring to the drawings in detail, A indicates, in general, a cap-shaped casing, one end of which is internally threaded, as at 2, and sufficiently large to be received by the cap threads 3 formed on a wheel hub 4. The opposite end of the casing is entirely closed and provided with a nut-like extension 5, through which extends a screw 6.

Formed externally of the enlarged end is a slightly tapered threaded section 7, and adapted to be received by said threaded section is a nut 8 which may be turned by means of a removable handle or rod 9. The enlarged section of the casing carrying the threaded sections 2 and 7 is split into six or more sections, as shown at 10, thereby permitting the nut 8, when turned, to contract the sections and materially reduce the inside diameter thereof when it is applied.

Figure 2:
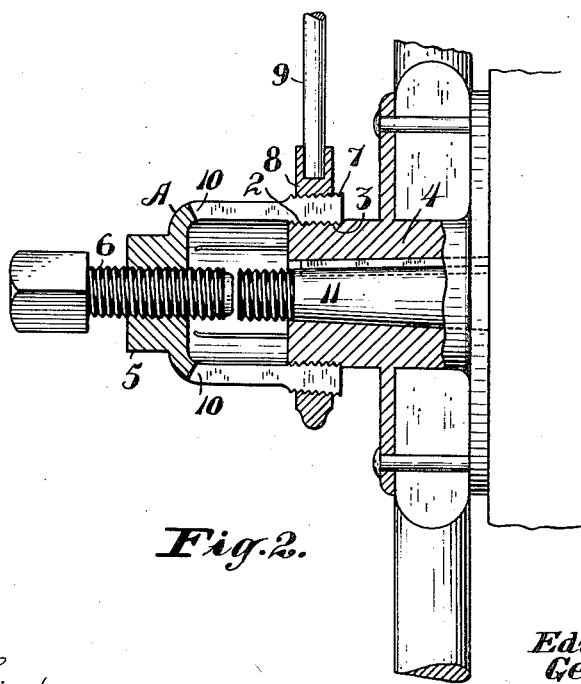
Fig. 2 is a central, longitudinal section through the puller, showing it applied to a wheel and in position to remove it from the axle.

The application of the puller is shown in Fig. 2. To use it, it is only necessary to remove the hub cap and to screw on the casing A in place thereof. The nut 8 is then turned until the split sections securely grip the threaded portion of the hub and it is then only necessary to turn the screw 6 by means of a wrench or other suitable tool until it exerts its pressure against the end of the axle 11 and pulls the wheel off of the shaft.

The wheel puller may be constructed of tool steel, if desired, and may, therefore, serve the function of a die; that is, a slight contraction of the split end of the casing permits cleaning or renewing of the threads where they have been crossed or otherwise damaged, thereby serving as a combination die and screw jack and a contractible clamp. The casing may be made sufficiently large to handle any sized wheel and axle desired, and the materials and finish of the several parts of the device may be such as the experience and judgment of the manufacturer may dictate.

Having thus described our invention, what we claim and desire to secure by Letters Patent is—

A wheel puller comprising a cap-shaped casing, one end of which is split into a plurality of sections and externally and internally threaded, a nut adapted to be received by the external threads, and a screw received by the opposite end of the casing and extending longitudinally therethrough.

In testimony whereof we have hereunto set our hands in the presence of two subscribing witnesses.

EDWIN B. CANTRELL.
GEORGE E. MILLER.

Witnesses:
JOHN H. HERRING,
G. M. BALL.